US006684019B1

(12) United States Patent
Norwood et al.

(10) Patent No.: US 6,684,019 B1
(45) Date of Patent: Jan. 27, 2004

(54) PLANAR POLYMERIC WAVEGUIDE DEVICES WITH TEMPERATURE DEPENDENCE CONTROL FEATURES

(75) Inventors: Robert A. Norwood, West Chester, PA (US); Louay Eldada, Lexington, MA (US); Shing Yin, Basking Ridge, NJ (US); Cathy Glass, Sewickley, PA (US); Robert M. Blomquist, Whippany, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/510,331

(22) Filed: Feb. 22, 2000

Related U.S. Application Data

(60) Provisional application No. 60/121,259, filed on Feb. 23, 1999.

(51) Int. Cl.$^7$ .................................................. G02B 6/10
(52) U.S. Cl. ........................ 385/129; 385/130; 385/131
(58) Field of Search ................................. 385/129, 130, 385/131, 132, 15, 31, 27, 39

(56) References Cited

U.S. PATENT DOCUMENTS

| 4,904,037 | A |   | 2/1990 | Imoto et al. |
| 4,978,188 | A | * | 12/1990 | Kawachi et al. ......... 350/96.12 |
| 5,613,995 | A |   | 3/1997 | Bhandarkar et al. |
| 5,978,539 | A |   | 11/1999 | Davies et al. |
| 6,293,688 | B1 | * | 9/2001 | Deacon ...................... 362/556 |
| 2001/0028494 | A1 | * | 10/2001 | Norwood et al. ........... 359/290 |

OTHER PUBLICATIONS

"Three–dimensional athermal waveguides for temperature independent lightwave devices", Y. Kokubun, M. Takizawa and S. Taga, Electronics Letters, Jul. 21, 1994, vol. 30, No. 15, pp. 1223–1224.

* cited by examiner

Primary Examiner—Rodney Bovernick
Assistant Examiner—Sung Pak
(74) Attorney, Agent, or Firm—Barbara C. Siegell, Esq.

(57) ABSTRACT

An optical signal device which is temperature sensitive and has at least one waveguide layer and at least one material incorporated into the device having a coefficient of thermal expansion of from about 20 to 200 ppm/°K sufficient to impart tensile stress to the waveguide layers as the temperature of the optical signal device changes.

15 Claims, 3 Drawing Sheets

PLANAR POLYMERIC WAVEGUIDE DEVICES WITH TEMPERATURE DEPENDENCE CONTROL FEATURES

RELATED APPLICATION

This application claims the priority benefits of U.S. Provisional Application Ser. No. 60/121,259 filed Feb. 23, 1999.

FIELD OF THE INVENTION

The present invention relates generally to planar optical waveguide devices and particularly to planar optical waveguide devices in which at least one coating layer is provided which has a coefficient of thermal expansion sufficient to impart tensile stress to the device in response to a change in temperature.

BACKGROUND OF THE INVENTION

It has been observed that optical waveguide devices made of polymeric materials can exhibit differences in response characteristics depending upon the ambient temperature. It would be useful if the rate of change with temperature of planar optical waveguide response characteristics could be controlled. This would provide optical devices whose waveguide responses may be selected which are either substantially unaffected by minor temperature fluctuations or are materially affected by such changes (i.e. selected for their tuning capability). As used herein the term "tuning" means that the optical filter element of the optical signal device may have its ability to reflect light varied preferentially for a preselected wavelength.

For example, gratings made in planar polymeric optical waveguides can exhibit significant changes in spectral response as temperatures vary. If such changes are not desirable it is necessary to fabricate multiple waveguide devices depending on the range of operating temperatures. In some cases it is desirable that little or no change in spectral response occurs with temperature. For instance, if a grating is designed to preferentially isolate a particular frequency from a host of other frequencies, it is desirable that the selected frequency does not change throughout the typical ambient temperature fluctuations that occur during use. Such temperature fluctuations can adversely affect the accuracy of readings, or require highly accurate forms of temperature control.

In other instances, however, it is desirable that the change in spectral response occur at a controlled rate (i.e., the device has tuning capability). For example, an optical sensor comprising a waveguide and a grating could be used to measure temperature. The sensitivity of the sensor would be related to the ability to control the rate at which the wavelength response varies with temperature (i.e., the control of $d\lambda_B/dT$).

The sensitivity ($d\lambda_B/dT$) for a planar polymeric grating of an optical signal device is currently determined by the intrinsic properties of the planar waveguide materials. These intrinsic properties include the coefficient of the thermal expansion (CTE) and the change in refractive index of the materials with temperature (dn/dT). The CTE and dn/dT properties vary linearly with temperature and their values are dependent on the composition of the materials used to fabricate the optical waveguide devices. Finding suitable materials to make gratings in planar optical waveguides with the required optical properties can be extremely difficult. To then require that the material have the correct temperature sensitive response ($d\lambda_B/dT$) can make the problem of materials selection even more difficult. It would, therefore, be beneficial to have an optical signal device in which $d\lambda_B/dT$ could be either set to zero or controlled within a desirable range without having to change the composition of the waveguide materials. This would enable a single waveguide device to operate within a range of selected values for $d\lambda_B/dT$.

Such control would also be beneficial in the use of planar optical directional couplers. Single mode optical directional couplers are normally used as interferometric beam splitters to split signals into numerous alternative paths. Most commonly they are input/output devices where one input is split among two outputs with some characteristic splitting ratio. This splitting ratio is affected by slight dimensional changes in the spacing between the optical paths. By controlling either of the operative components of the optical signal device (CTE and/or dn/dT), it would be possible to control the sensitivity of the splitting ratio.

Moreover, the use of operative components with a controlled CTE could also have use in the control of multi mode Interference (MMI) devices. Such devices are strongly dependent on their dimensions and can, therefore, be affected by temperature fluctuations. Proper selection of components with controlled CTE could help control their performance as well.

It would therefore be a significant advance in the art of producing and using optical signal devices to provide such devices with a controllable sensitivity (i.e. to control the rate at which the frequency response varies with temperature).

It would be a further advance in the art to produce and use optical signal devices in which the device has tuning capability.

SUMMARY OF THE INVENTION

The present invention is generally directed to an optical signal device having controlled sensitivity particularly to fluctuations in temperature. In a particular aspect of the present invention there is provided.

An optical signal device comprising:
a) a planar polymeric optical signal device which is temperature sensitive and having waveguide layers therein, and
b) at least one material incorporated into said optical signal device, having a co-efficient of thermal expansion of from about 20 to 200 ppm/°K sufficient to impart tensile stress to said waveguide layers as the temperature of the optical signal device changes.

In a particular aspect of the present invention, the material is incorporated as at least one separate layer or forms at least a portion of a substrate.

BRIEF DESCRIPTION OF THE DRAWING

The following drawings are illustrative of embodiments of the invention and are not intended to limit the scope of the invention as encompassed by the claims forming part of the application.

DETAILED DESCRIPTION OF THE INVENTION

The present invention is generally directed to providing one or more temperature sensitive components having a coefficient of thermal expansion within the range of from about 20 to 200 ppm/°K as part of the substrate or as at least one layer above and/or below an optical signal device to cause stress therein. The components, typically in the form of layers of polymeric materials, are selected to have a coefficient of thermal expansion (CTE) in a range that will result in a stress being imparted to the waveguide layers as a change in temperature occurs. The CTE is generally in the range of from about 20 to 200 ppm/°K, preferably from about 100 to 160 ppm/°K. The applied stress induced in accordance with the present invention may modify the dimensions of the device and/or it may change the refractive index of the waveguide materials. By correctly employing a polymeric material with the desired CTE value, the sensitivity of the device can be altered into a desired controllable region.

Figure 1:
FIGS. 1–8B are cross-sectional views showing the development of a grating region for use in the present invention.

The development of a grating region of an optical signal device as customarily employed is shown with reference to FIGS. 1–8B. According to a preferred embodiment of the invention, a film of a lower cladding polymerizable composition 1 is applied to the surface of a substrate 4, as shown in FIG. 1. The film may be applied in a number of different ways known in the art, such as spin coating, dip coating, slot coating, roller coating, doctor blading, liquid casting or the like. Generally, the lower cladding polymerizable composition is applied at a thickness of from at least about 0.01 microns, preferably at least about 1 micron, to about 10 microns or more.

While the lower cladding layer can be made from any material having a refractive index lower than the core, the most preferred lower cladding material is a fluoropolymeric composition as described below. Such a low loss cladding material is preferred in part because a minor portion of the optical signal is transmitted through the cladding material.

Figure 2:
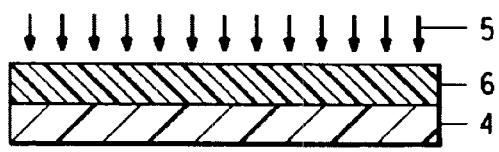

Preferably, the lower cladding polymerizable composition is curable by heat and/or actinic radiation. More preferably, the lower cladding polymerizable composition is photocurable by actinic radiation. Upon exposure to an appropriate source of radiation 5 effective to at least partially cure the lower cladding polymerizable composition, as shown in FIG. 2, a lower cladding layer 6 is formed on the substrate 4. Preferably, the radiation 5 is a blanket or overall, non-imagewise exposure of ultraviolet radiation.

Figure 3:
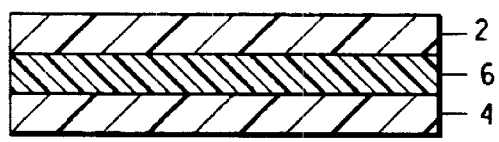

To form the light transmissive region or core, a thick or thin film of a core polymerizable composition 2 is applied to the lower cladding layer 6, as shown in FIG. 3. Generally, the core polymerizable composition is applied at a thickness of from about 1 micron to about 1 mm, preferably from about 5 microns to about 500 microns. Preferably, the core polymerizable composition is photopolymerizable, i.e., curable by exposure to actinic radiation.

Figure 4:
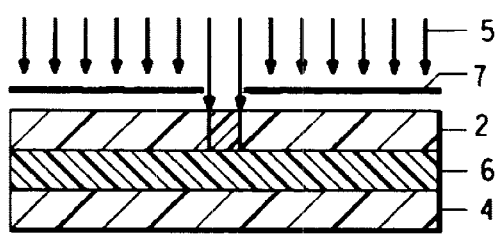

The core polymerizable composition layer is imagewise exposed to a suitable form of during radiation 5 that is effective to at least partially cure the exposed, image portion of the core polymerizable composition layer without substantially curing the unexposed, non-image areas of the core polymerizable composition layer, as shown in FIG. 4. Preferably, the curing radiation 5 is actinic radiation, more preferably ultraviolet radiation, exposed through a core photomask 7. The position and dimensions of the light transmissive core is determined by the pattern of the actinic radiation upon the surface of the film. The radiation pattern preferably is chose so that the polymerizable composition is polymerized in the desired pattern and so that other regions of the core polymerizable film remain substantially unreacted. If, as in a preferred embodiment, the polymerizable composition is photocurable, the photopolymer is conventionally prepared by exposing the core polymerizable composition to actinic radiation of the required wavelength and intensity for the required duration to effect the at least partial curing of the photopolymer.

In one preferred embodiment, the core polymerizable composition is not fully cured, but is only partially polymerized prior to applying the upper cladding polymerizable composition. Partially polymerized means that some polymerizable end groups described more fully below are present after polymerization, i.e., not all the polymerizable end groups are converted to saturated hydrocarbons. This means that more than 0% but less than 50% of the number of polymerizable end groups, preferably less than about 20% of the polymerizable end groups, remain unreacted prior to applying the upper cladding polymerizable composition. Partial polymerization of the core polymerizable composition layer prior to application of the upper cladding polymerizable composition layer allows the two compositions to intermingle at their interface. This improves adhesion of the two layers and also reduced optical loss by reducing scattering at the interface of the core and cladding. The same partial polymerization technique can be used at the lower cladding/core interface as well by not fully curing the lower cladding polymerizable composition layer before applying the core polymerization composition layer.

Figure 5:
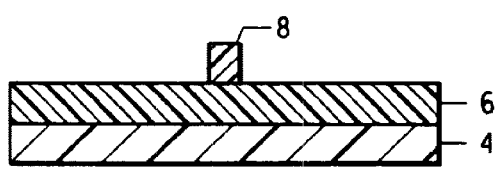

After the core polymerizable composition has been at least partially polymerized to form the predetermined pattern of the polymer on the surface of the lower cladding layer, the pattern is then developed to remove the nonimage areas and leave behind the predetermined pattern of core 8, as shown in FIG. 5. Any conventional development method can be used, for example, flushing with a solvent for the unirradiated composition. Such solvents are acetone, methanol, propanol, tetrahydrofuran and ethyl acetate.

Although FIGS. 4 and 5 show the formation of just one core using a photomask having one transparent image-forming region, the skilled artisan will appreciate that multiple spaced-apart cores could be formed on the lower cladding simultaneously using a photomask having multiple transparent image-forming regions or similar devices capable of causing the exposure of multiple image areas.

Figure 6:
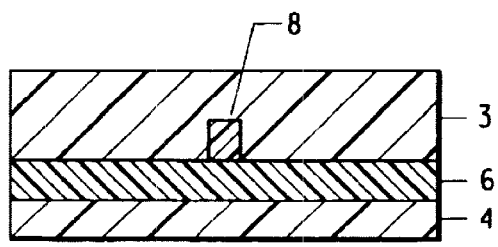
Figure 7A:
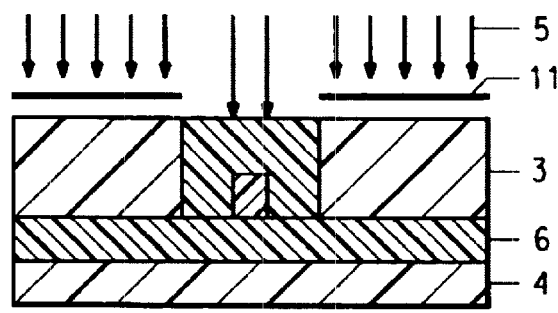
Figure 7B:
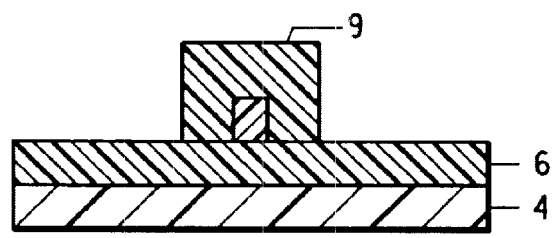

Two alternative methods of forming the upper cladding layer will now be described. In each case, a film of upper cladding polymerizable composition 3 is applied over the lower cladding layer 6 and core 8, as shown in FIG. 6. Like the lower cladding layer, while the upper cladding layer can be made from any material having a refractive index lower than the core, the most preferred upper cladding material is a fluoropolymeric composition as described below. Such a low loss cladding material is preferred in part because a minor portion of the optical signal is transmitted through the cladding material.

Preferably, the upper cladding polymerizable composition is curable by heat and/or actinic radiation. More preferably, the upper cladding polymerizable composition is photocurable by actinic radiation. The preferred form of actinic radiation is ultraviolet radiation.

The upper cladding polymerizable composition layer is at least partially cured by an appropriate form of curing radiation 5. In one method shown in FIGS. 7A and 7B, actinic radiation is exposed through an imaging cladding photomask 11 to form an imaged, at least partially cured region and unexposed, uncured regions. The upper cladding layer 9 is developed by removal of the unexposed, uncured regions by an appropriate solvent, for example. The resulting core 8 and upper cladding layer 9 form a ridge-like structure extending above the plane of the lower cladding layer 6 and substrate 4. Upper cladding 9 covers the top and sides of the core 8. This type of upper cladding 9 is advantageous since its core 8 exhibits low internal stresses.

Preferably, the core 8 is entirely enveloped by the lower cladding layer 6 and upper cladding layer 9.

Figure 8A:
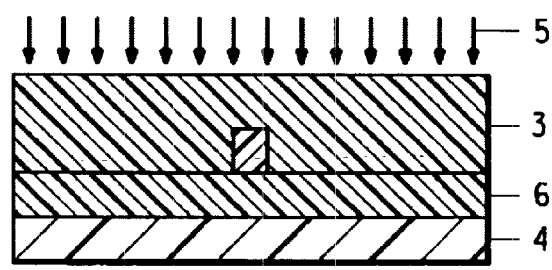
Figure 8B:
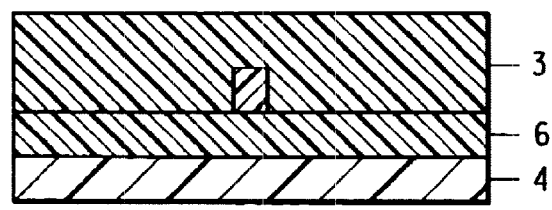

In an alternative method shown in FIGS. 8A and 8B, the upper cladding polymerizable composition layer 3 is simply blanketed, overall, or non-imagewise exposed to a suitable form of curing radiation 5 effective to at least partially cure the upper cladding polymerizable composition, as shown in FIG. 8A, to form a planar upper cladding layer 10, as shown in FIG. 8B. Preferably, the core 8 is entirely enveloped by the lower cladding layer 6 and upper cladding layer 10.

In accordance with the present invention, the waveguide assembly described in connection with FIGS. 1–8B is provided with at least one additional layer which imparts stress to the waveguide in the presence of a temperature change.

Figure 9A:
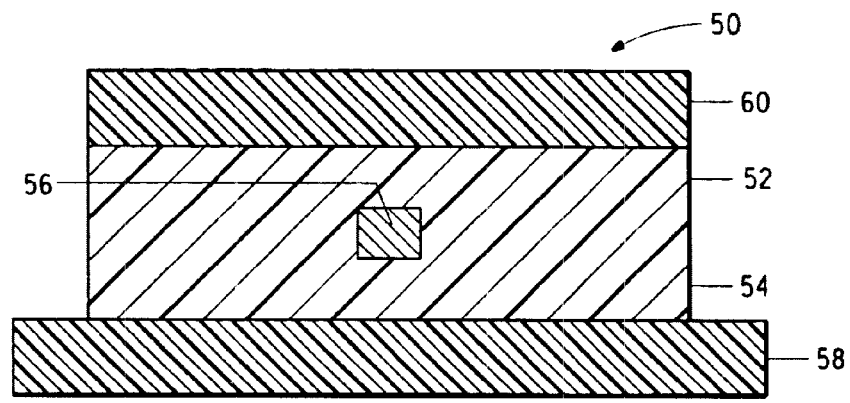
FIG. 9A is a cross-sectional view of an embodiment of the present invention a grating region as developed in FIGS. 1–8B with a layer of a selected CTE to impart stress to the optical signal device employed in the present invention.
Figure 9B:
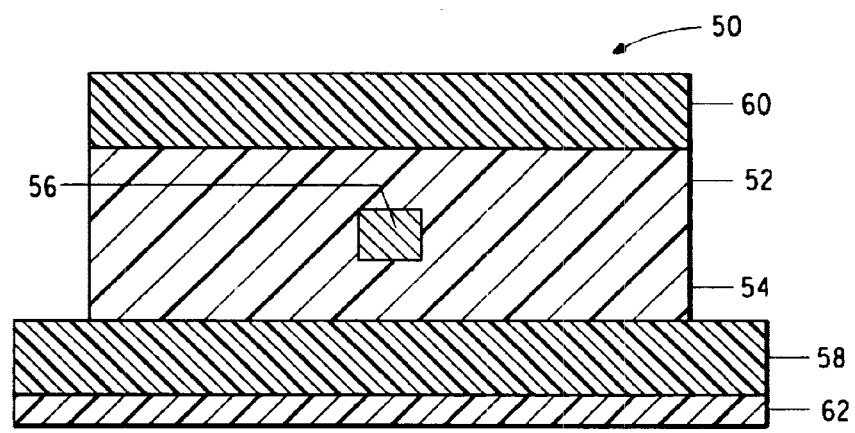
FIG. 9B is a cross-sectional view similar to FIG. 9A with multiple layers used to impart stress to the optical signal device.

Referring specifically to FIG. 9A, there is shown a waveguide assembly 50 having an upper cladding layer 52, a lower cladding layer 54 and a core region 56 there between on a substrate 58 as described above in connection with FIGS. 1–8B. As shown in the embodiment of FIG. 9A there is provided at least one layer 60 (only a single layer is shown) which is made of a material having a coefficient of thermal expansion of from about 20 to 200 ppm/°K, preferably from about 100 to 160 ppm/°K. The material, upon a change of temperature, is capable of imparting stress to the waveguide. In a further embodiment as shown in FIG. 9B at least one additional layer 62 made of a material having the desirable CTE properties is provided on the substrate 58 which is likewise capable of imparting stress to the waveguide. In a still further embodiment of the invention, the stress inducing material may be incorporated into the substrate.

The layer 60 preferably has a modulus which is greater than about ½that of the cladding and core polymer layers, more preferably greater than 1× modulus most preferably greater than 2× modulus. Such a relationship in combination with the use of a thickness greater than about the thickness of the waveguides layers 52 and 54 ensures that an appreciable to predominate proportion of the strain developed from the mismatch in CTE's will occur within the waveguide layers 52, 54 and 56.

Once the optical signal device is constructed in the manner shown in FIGS. 1–9B the value of $d\lambda_B/dT$ for the optical signal device is measured. Additional layers 60 and/or 62 may be provided or the substrate may be provided with a desirable stress inducing material, and the process is repeated until the desired $d\lambda_B/dT$ value is achieved.

As an example of this procedure, gratings were made using UV curable materials with a refractive index difference between the core and cladding of 0.0055. Table 1 below shows the value of $d\lambda_B/dT$ that is obtained when substrates of differing CTE values are utilized.

TABLE 1

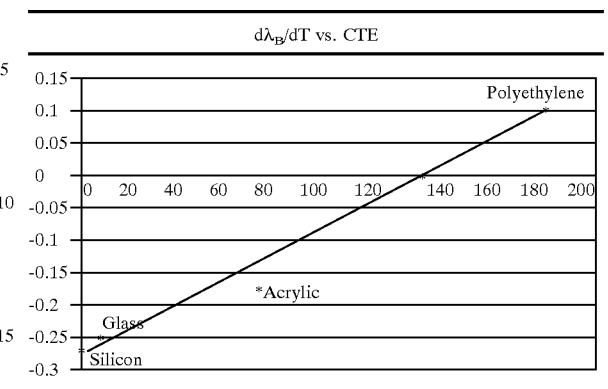

CTE in ppm per Degree K

The linear relationship shown in Table 1 for $d\lambda_B/dT$ versus CTE may be confirmed by referring to the equation below for a Bragg grating:

$$2 \cdot \Lambda \cdot n_{eff} = \lambda_B$$

where $\Lambda$ is the grating period and $n_{eff}$ is the effective refractive index of the waveguide. If we take the derivative with respect to temperature and assume variable independence we obtain.

$$2 \cdot \frac{N_{eff}}{dT} \cdot d\Lambda + 2 \cdot \Lambda \frac{dn_{eff}}{dT} = \frac{d\lambda_B}{dT}$$

As a first approximation, we can assume that $dn_{eff}/dT$ is constant with respect to CTE for the particular materials used to make the polymeric waveguides. This means that $d\lambda_B/dT$ should vary linearly with $d\Lambda/dT$. Since the change in grating period in a polymeric waveguide with respect to temperature is a result of its effective CTE, it can be seen that, as a first approximation, $d\lambda_B/dT$ varies linearly with respect to the effective CTE of the waveguide. Since the waveguide is a thin film bonded to a thicker substrate, the effective CTE of the waveguide is dependent on both the CTE of the polymeric material employed in the waveguide and the CTE of the substrate.

The preferred polymeric materials having the desirable CTE values for use as the additional layers or as part of the substrate to impart stress to the optical waveguides include urethanes, epoxies, polysulfides, silicones, acrylics, polyesters, polyolefins and the like. Such polymeric materials are suitable because they have the advantage of being able to be formulated with a wide variety of CTE values. For example, Dow Chemicals "Typical Physical Properties of Pellethane" brochure lists CTE values for these unfilled thermoplastic urethanes with ranges from about 88 to 171 ppm/°C. The CTE values are shown to vary roughly inversely in accordance with their hardness measurements. Mixed with the proper filler, even lower CTE values are possible. Because two component thermoset urethanes can be applied as a liquid coating and then cured, they have an advantage of allowing a wide variety of either molding or casting methods in making very flat substrates that are needed for this application.

For this reason as an embodiment of the present invention, two component urethanes with differing hardness levels were formulated and used in this procedure. In order to improve the adhesion of the subsequent UV curable layers to this material, the urethanes were specially formulated to contain an acrylic functionality. The resultant values for $d\lambda_B/dT$ are shown in Table 2 below:

TABLE 2

| Hardness | |
|---|---|
| 98 Shore "A" | −0.12 nm/° C. |
| 60 Shore "A" | −0.06 nm/° C. |

The value of $d\lambda_B/dT$ can be adjusted to be sufficiently close to zero to provide essentially temperature-independent $\lambda_B$. With any of the above-mentioned polymeric materials, the value of $d\lambda_B/dT$ for a particular waveguide grating can be easily varied to meet a particular application. The value of $d\lambda_B/dT$ will typically be in the range of from about −0.1 nm/°C. to 0.1 nm/°C. When the goal is to achieve temperature independence (or athermalization), then $d\lambda_B/dT$ is preferably within a range from ±0.02 nm/°C. and more preferably within a range of ±0.01 nm/°C., and most preferably within a range of ±0.005 nm/°C.

EXAMPLE 1

A negative-tone liquid photomonomer (from a mixture of 20.0 g ethoxylated bisphenol A diacrylate, 10.0 g tripropylene glycol diacrylate, 0.6 g photoinitiator (Irgacure 651), 0.09 g antioxidant (Irganox 1010) was spin-coated on the selected substrate so as to form a layer that was 10 microns thick and was subsequently uniformly UV-cured under a mercury lamp (Hg i-line, wavelength=365 nm) forming a solid thin film having a refractive of index 1.4895 (when fully cured) as an undercladding layer. The exposure time was limited to one second to obtain a partially polymerized layer.

A negative-tone liquid photomonomer (from a mixture of 20.0 g ethoxylated biphenol A diacrylate, 8.0 g tripropylene glycol diacrylate, 2.0 g 1,6-hexanediol diacrylate, 0.6 g photoinitiator(Irgacure 651), and 0.09 g antioxidant (Irganox 1010) was spin-coated onto the undercladding layer so as to form a layer that was 6 microns thick. The sample then was placed in contact with a mask where the waveguide circuit (a straight guide) was clear (the width of the waveguides in the mask was 5 microns). The layer was subsequently selectively UV-cured through the mask under a mercury lamp for a short time of 3 seconds to ensure only partial polymerization and to solidify the core waveguide circuit which had a refractive index of 1.4970 (when fully cured).

The mask was removed and the unexposed sections were developed away using methanol. The same photomonomer used for the undercladding layer was spin-coated onto the core structures so as to form a conformal layer that was 10 microns thick; that layer was subsequently blanket UV-exposed for a short time (1 second) to ensure only partial polymerization at this stage. A phase mask was used to print (using an Argon ion laser operating at 363.8 nm) a grating across a section of the waveguide. The sample with the planar waveguide circuit was held parallel to the phase mask at 50 microns from said mask. The laser beam was directed perpendicularly to the mask and the sample. The laser beam diameter was 3 mm (at $1/e^2$ intensity). The laser was scanned 5 mm across the center of the waveguide, creating gratings in the three partially cured waveguide layers. The sample was finally subjected to a final UV cure in a nitrogen at ambient temperature under the mercury lamp for 60 seconds followed by a final thermal cure at 90° C. for one hour, resulting in full polymerization of all three layers. Testing of the sample gave the values for $d\lambda/dT$ as indicated in Table 3.

For the urethane samples, the formulations were as follows:

TABLE 3

|  | 98 Shore "A" hardness | 60 Shore "A" hardness |
|---|---|---|
| *Isonate isocyanate 143 L (Dow Chemical) | 37.8% | 24% |
| **Voranol 230-238 | 57.2% | — |
| **Voranol 230-112 | — | 71% |
| ***Peta-K+ (UCB Radcure) | 5.0% | 5.0% |

*aromatic isocyanate
**trifunctional polyether polyol with MW = 700 (238) or MW = 1500 (112)
***Peta-K is a multifunctional acrylate compound with residual hydroxyl groups. The addition of this compound improves adhesion to the subsequent acrylate layers.

The substrate was made by pouring the above mixtures into a polyethylene mold and curing at 70° C. overnight. The samples were then demolded to yield 1 mm thick substrates. The gratings were formed on these substrates in the same manner as described above. The samples were then trimmed with a dicing saw and measured to determine $d\lambda/dT$.

The waveguides described above may be incorporated into an optical signal device in the following manner.

Figure 10:
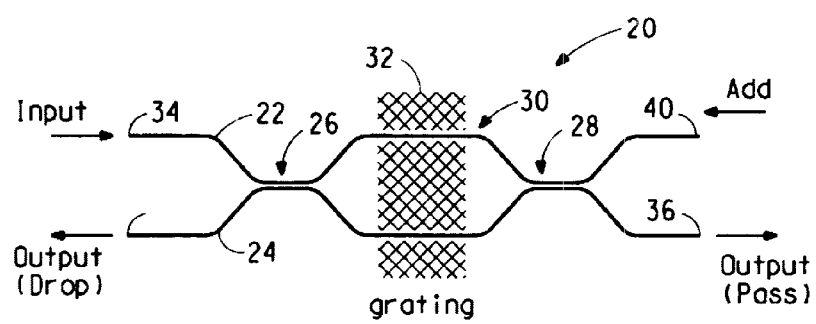
FIG. 10 is a schematic view of one embodiment of an optical signal device in accordance with the present invention.

Referring to FIG. 10, there is shown a single channel add/drop optical signal in the form of a Mach-Zehnder device 20 which is formed on a substrate (see FIGS. 1–9B for the relative position of the substrate). The device 20 shown in FIG. 2 in which evanescent coupling occurs in the coupling regions has two substantially identical planar waveguides 22, 24 which are aligned with each other in two 3-dB coupling regions 26, 28 in the form of directional couplers. Between the coupling regions 26 and 28 is a grating region 30 comprised of a grating system 32 (e.g. Bragg gratings).

The waveguides 22 and 24, produced in accordance with the present invention such as shown in the embodiments of FIGS. 9A–9B, are spaced apart from each other a sufficient distance so that evanescent coupling does not occur in the grating region 30.

Light of multiple wavelengths enter the device 20 through an input port 34. Wavelengths that are not resonant with grating system 32 propagate through the grating to an output port 36 for further treatment (e.g. further demultiplexing). One preselected wavelength of light that is resonant with the grating system 32 is reflected in the grating region 30 and exits the device 20 through a drop port 38. Light of a predetermined wavelength may be added to the device 20 through a port 40.

The preferred embodiments of the present invention will be better understood by those skilled in the art by reference to the above description and figures. The description and preferred embodiments of this invention illustrated in the figures are not to intended to be exhaustive or to limit the invention to the precise form disclosed. They are chose to describe or to best explain the principles of the invention and its applicable and practical use to thereby enable others skilled in the art to best utilize the invention.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An optical signal device comprising:
   a) a planar optical signal device which is temperature sensitive and having at least one waveguide layer therein, and
   b) at least one first material incorporated into said optical signal device, having a co-efficient of thermal expansion of from about 20 to 200 ppm/°K sufficient to impart a reversible tensile stress to said waveguide layers as the temperature of the optical signal device changes.

2. The optical signal device of claim 1 wherein the first material is selected from the group consisting of polyurethanes, epoxies, polysulfides, silicones, acrylics, polyesters and polyolefins.

3. The optical signal device of claim 1 wherein the first material has a coefficient of thermal expansion of from about 100 to 160 ppm/°K.

4. The optical signal device of claim 1 wherein the first material is positioned as at least one layer on said optical signal device.

5. The optical signal device of claim 1 further comprising a substrate, said first material forming at least a portion of the substrate.

6. The optical signal device of claim 1 having a $d\lambda_B/dT$ value of from about −0.1 to 0.1 nm/°C.

7. The optical signal device of claim 1 wherein the planar optical signal device comprises a pair of spaced apart cladding layers comprised of a second material having a first refractive index value, a core layer positioned between the pair of cladding layers having a second refractive index value greater than the first refractive index value such that the difference between the second and first refractive index values enables a multiple wavelength light source to pass through the device in a single mode, and a grating region comprising filter means extending through the core and cladding layers for causing a single wavelength of light of said multiple wavelength light source to be segregated therefrom.

8. The optical signal device of claim 7 wherein the first material is selected from the group consisting of polyurethanes, epoxies, polysulfides, silicones, acrylics, polyesters and polyolefins.

9. The optical signal device of claim 7 wherein the first material has a coefficient of thermal expansion of from about 100 to 160 ppm/°K.

10. The optical signal device of claim 7 wherein the first material is positioned as at least one layer on said optical signal device.

11. The optical signal device of claim 7 further comprising a substrate, said first material forming at least a portion of the substrate.

12. The optical signal device of claim 1 having a $d\lambda_B/dT$ value of from about −0.1 to 0.1 nm/°C.

13. The optical signal device of claim 1 which is a planar polymeric optical signal device.

14. The optical signal device of claim 7 which is a planar polymeric optical signal device.

15. An optical signal device comprising:
   a) a planar polymeric optical signal device which is temperature sensitive and having at least one polymeric waveguide layer therein including a polymeric substrate, and
   b) at least one first polymeric material incorporated into said optical signal device, having co-efficient of thermal expansion of from about 20 to 200 ppm/°K sufficient to impart a reversible tensile stress to said polymeric waveguide layers as the temperature of the optical signal device changes.

* * * * *